United States Patent
Aukes et al.

(10) Patent No.: US 12,017,347 B2
(45) Date of Patent: Jun. 25, 2024

(54) PINCHED TUBES FOR RECONFIGURABLE ROBOTS

(71) Applicants: Daniel Aukes, Gilbert, AZ (US); Mohammad Sharifzadeh, San Diego, CA (US); Yuhao Jiang, Tempe, AZ (US); Nicholas Gravish, San Diego, CA (US); Mingsong Jiang, Anshan (CN)

(72) Inventors: Daniel Aukes, Gilbert, AZ (US); Mohammad Sharifzadeh, San Diego, CA (US); Yuhao Jiang, Tempe, AZ (US); Nicholas Gravish, San Diego, CA (US); Mingsong Jiang, Anshan (CN)

(73) Assignees: Arizona Board of Regents on behalf of Arizona State University, Scottsdale, AZ (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 17/971,062

(22) Filed: Oct. 21, 2022

(65) Prior Publication Data

US 2023/0127106 A1    Apr. 27, 2023

Related U.S. Application Data

(60) Provisional application No. 63/270,921, filed on Oct. 22, 2021.

(51) Int. Cl.
  *B25J 9/14*  (2006.01)
  *B25J 9/06*  (2006.01)
  (Continued)

(52) U.S. Cl.
  CPC ............. *B25J 18/06* (2013.01); *B25J 9/06* (2013.01); *B25J 9/142* (2013.01); *B25J 17/0241* (2013.01)

(58) Field of Classification Search
  CPC ........................................................ B25J 9/142
  See application file for complete search history.

(56) References Cited

U.S. PATENT DOCUMENTS

| | | | |
|---|---|---|---|
| 11,492,434 B2 | 11/2022 | Emami et al. | |
| 2023/0121727 A1 | 4/2023 | Aukes et al. | |

FOREIGN PATENT DOCUMENTS

| | | | | |
|---|---|---|---|---|
| CN | 110125924 A | * | 8/2019 | ......... B25J 15/0616 |
| CN | 110253561 A | * | 9/2019 | |
| WO | WO-2015102723 A2 | * | 7/2015 | ......... B25J 15/0023 |

OTHER PUBLICATIONS

Amir Firouzeh, Marco Salerno, and Jamie Paik. Stiffness control with shape memory polymer in underactuated robotic origamis. IEEE Transactions on Robotics, 33(4):765-777, 2017.

(Continued)

*Primary Examiner* — Randell J Krug
(74) *Attorney, Agent, or Firm* — Fish & Richardson P.C.

(57) ABSTRACT

A device includes a tube and a sleeve configured to at least partially encircle a portion the tube along its length. The tube is flexible and airtight and defines a longitudinal axis along a center of the tube, and is configured to bend along the longitudinal axis upon at least partial evacuation of the tube to form a joint. The joint defines a joint angle relative to the longitudinal axis, thereby approximating a revolute joint with torsional stiffness. Actuating a joint includes partially evacuating a flexible tube defining a longitudinal axis, thereby forming a bend in the tube at an angle with respect to the longitudinal axis at a perimeter of a rigid sleeve at (Continued)

least partially encircling the tube, and restoring a neutral pressure to the tube, thereby removing the bend in the tube.

20 Claims, 17 Drawing Sheets

(51) Int. Cl.
*B25J 17/02* (2006.01)
*B25J 18/06* (2006.01)

(56) References Cited

OTHER PUBLICATIONS

Brian H Do, Valory Banashek, and Allison M Okamura. Dynamically reconfigurable discrete distributed stiffness for inflated beam robots. In 2020 IEEE International Conference on Robotics and Automation (ICRA), pp. 9050-9056. IEEE, 2020.
Cecilia Laschi, Barbara Mazzolai, and Matteo Cianchetti. Soft robotics: Technologies and systems pushing the boundaries of robot abilities. Science Robotics, 1(1):eaah3690, Dec. 2016. 12 pages.
Daniela Rus and Michael T Tolley. Design, fabrication and control of soft robots. Nature, 521(7553):467, 2015. 9 pages.
Dylan Shah, Bilige Yang, Sam Kriegman, Michael Levin, Josh Bongard, and Rebecca Kramer-Bottiglio. Shape changing robots: Bioinspiration, simulation, and physical realization. Adv. Mater., 33:2002882, Sep. 2021, 12 pages.
Elliot W Hawkes, Laura H Blumenschein, Joseph D Greer, and Allison M Okamura. A soft robot that navigates its environment through growth. Science Robotics, 2(8), 2017. 8 pages.
F Renda, M Giorelli, M Calisti, M Cianchetti, and C Laschi. Dynamic model of a multibending soft robot arm driven by cables. IEEE Trans. Rob., 30(5):1109-1122, Oct. 2014.
Germ'an Sumbre, Graziano Fiorito, Tamar Flash, and Binyamin Hochner. Octopuses use a human-like strategy to control precise pointto-point arm movements. Curr. Biol., 16(8):767-772, Apr. 2006.
Hongbo Wang, Massimo Totaro, and Lucia Beccai. Toward perceptive soft robots: Progress and challenges. Advanced Science, 5(9):1800541, 2018. 17 pages.
Ian D Walker, Darren M Dawson, Tamar Flash, Frank W Grasso, Roger T Hanlon, Binyamin Hochner, William M Kier, Christopher C Pagano, Christopher D Rahn, and Qiming M Zhang. Continuum robot arms inspired by cephalopods. In Unmanned Ground Vehicle Technology VII, vol. 5804, pp. 303-314. International Society for Optics and Photonics, May 2005.
Jiang, M., Yu, Q., & Gravish, N. (2021). Vacuum induced tube pinching enables reconfigurable flexure joints with controllable bend axis and stiffness. 315-320. https://doi.org/10.1109/robosoft51838. 2021.9479201.
Jiang, Y., Sharifzadeh, M., & Aukes, D. M. (2020). Reconfigurable Soft Flexure Hinges via Pinched Tubes. IEEE/RSJ International Conference on Intelligent Robots and Systems (IROS), 8843-8850. https://doi.org/10.1109/IROS45743.2020.9341109.

Jianglong Guo, Khaled Elgeneidy, Chaoqun Xiang, Niels Lohse, Laura Justham, and Jonathan Rossiter. Soft pneumatic grippers embedded with stretchable electroadhesion. Smart Materials and Structures, 27(5):055006, 2018. 11 pages.
Jianing Wu, Yichao Zhao, Yunshu Zhang, David Shumate, Stephanie Braccini Slade, Scott V Franklin, and David L Hu. Elephant trunks form joints to squeeze together small objects. J. R. Soc. Interface, 15(147), Oct. 2018. 9 pages.
Jiefeng Sun and Jianguo Zhao. An adaptive walking robot with reconfigurable mechanisms using shape morphing joints. IEEE Robotics and Automation Letters, 4(2):724-731, 2019.
Jifei Ou, Lining Yao, Daniel Tauber, Jürgen Steimle, Ryuma Niiyama, and Hiroshi Ishii. jamsheets: thin interfaces with tunable stiffness enabled by layer jamming. In Proceedings of the 8th International Conference on Tangible, Embedded and Embodied Interaction, pp. 65-72, 2014.
Jindong Liu and Huosheng Hu. Biological inspiration: from carangiform fish to multi-joint robotic fish. Journal of bionic engineering, 7(1):35-48, 2010.
Li Wen, Tianmiao Wang, Guanhao Wu, and Jinlan Li. A novel method based on a force-feedback technique for the hydrodynamic investigation of kinematic effects on robotic fish. In 2011 IEEE International Conference on Robotics and Automation, pp. 203-208. IEEE, 2011.
M Sharifzadeh and D Aukes. Curvature-Induced buckling for Flapping-Wing vehicles. IEEE/ASME Trans. Mechatron., 2021, 26(1):503-514.
Mingsong Jiang, Rongzichen Song, and Nick Gravish. Knuckles that buckle: compliant underactuated limbs with joint hysteresis enable minimalist terrestrial robots. IEEE/RSJ International Conference on Intelligent Robots and Systems (IROS), 2020. 7 pages.
Ren Geryak and Vladimir V Tsukruk. Reconfigurable and actuating structures from soft materials. Soft Matter, 10(9):1246-1263, Mar. 2014.
Sang Yup Kim, Robert Baines, Joran Booth, Nikolaos Vasios, Katia Bertoldi, and Rebecca Kramer-Bottiglio. Reconfigurable soft body trajectories using unidirectionally stretchable composite laminae. Nature communications, 10(1):1-8, 2019.
Sangbae Kim, Cecilia Laschi, and Barry Trimmer. Soft robotics: a bioinspired evolution in robotics. Trends Biotechnol., 31(5):287-294, 2013.
Tamara Knutsen, Jim Ostrowski, and Kenneth McIsaac. Designing an underwater eel-like robot and developing anguilliform locomotion control. Harvard University, 2004. 24 pages.
Thomas George Thuruthel, Yasmin Ansari, Egidio Falotico, and Cecilia Laschi. Control strategies for soft robotic manipulators: A survey.Soft Robot, 5(2):149-163, Apr. 2018.
Usevitch, N. S., Hammond, Z. M., Schwager, M., Okamura, A. M., Hawkes, E. W., & Follmer, S. (2020). An untethered isoperimetric soft robot. Science Robotics, 5(40), 1-15. https://doi.org/10.1126/scirobotics.aaz0492.
V Vikas, P Grover, and B Trimmer. Model-free control framework for multi-limb soft robots. In 2015 IEEE/RSJ International Conference on Intelligent Robots and Systems (IROS), pp. 1111-1116. ieeexplore. ieee.org, Sep. 2015.

* cited by examiner

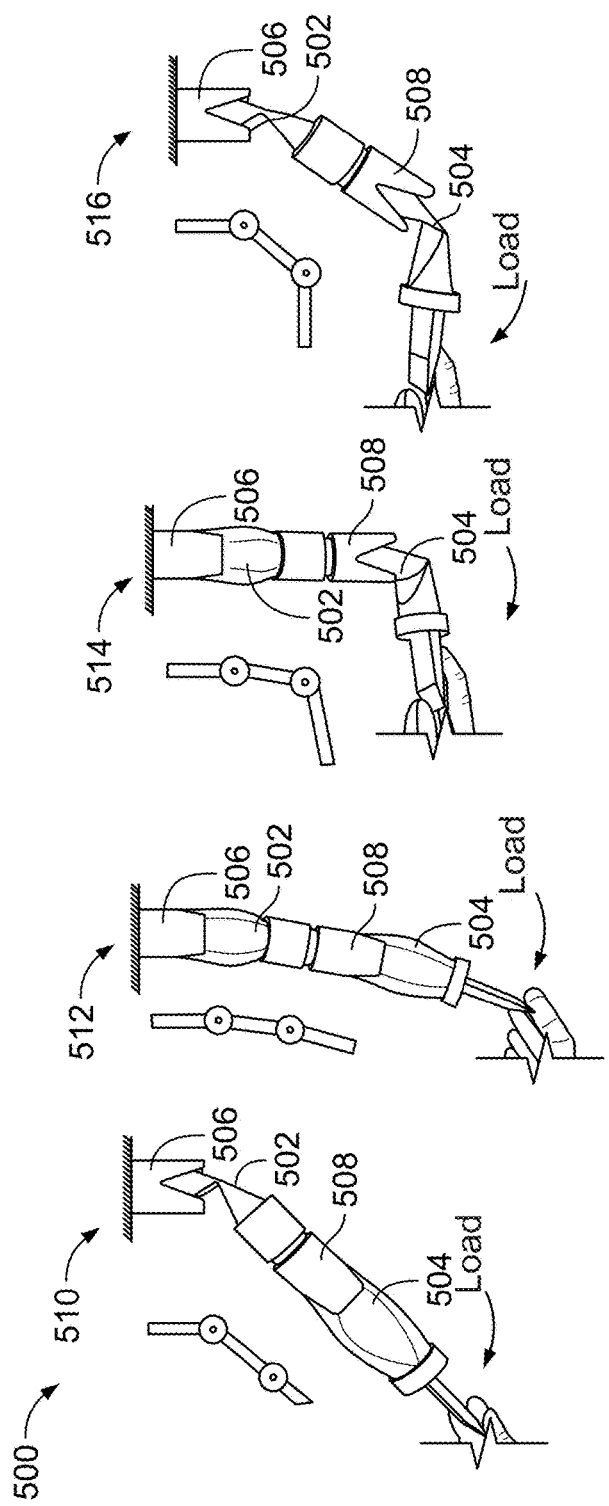
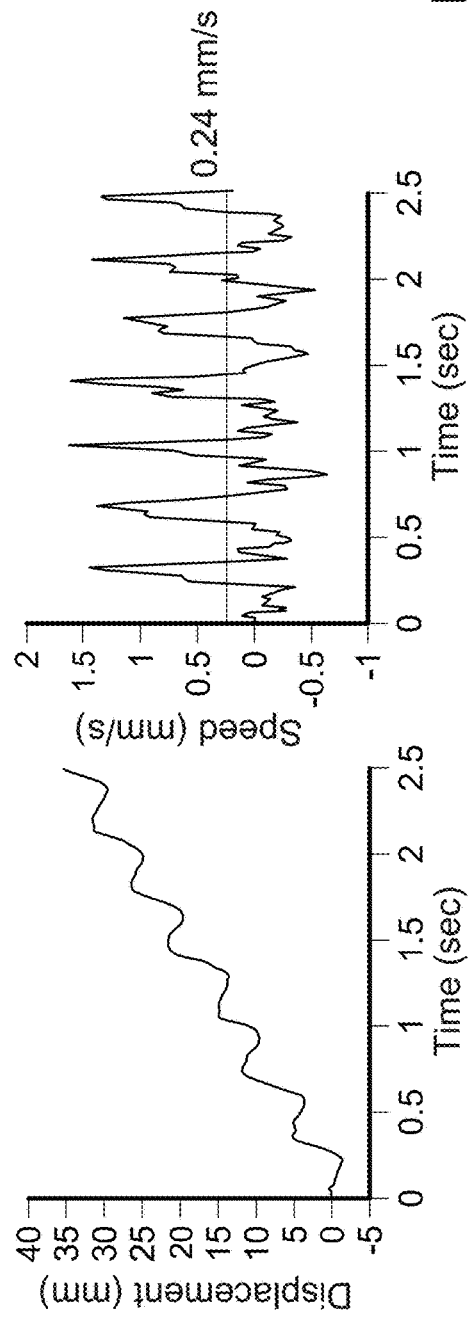
FIG. 5A
FIG. 5B

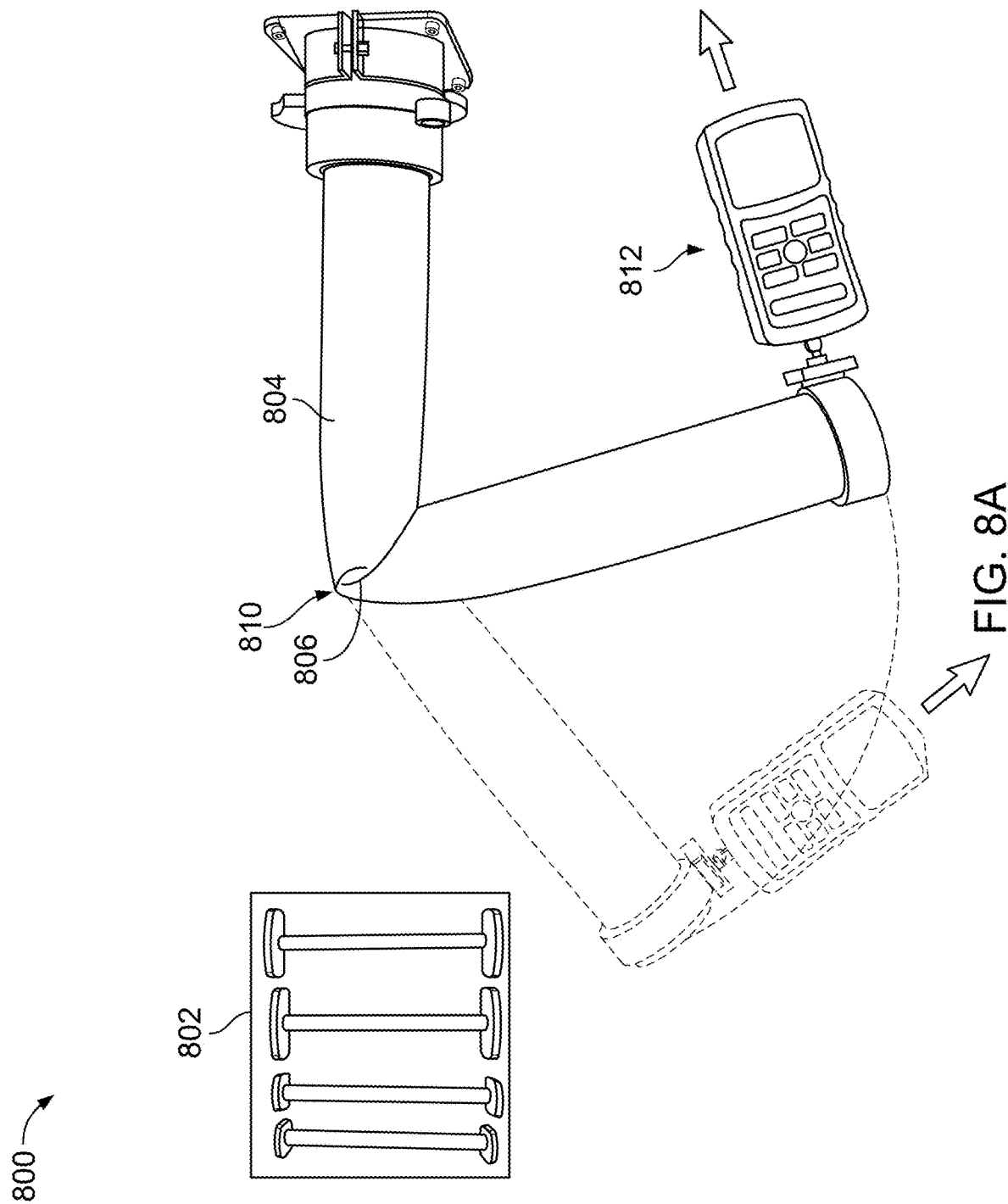

PINCHED TUBES FOR RECONFIGURABLE ROBOTS

CROSS-REFERENCE TO RELATED APPLICATION

This application claims the benefit of U.S. Patent Application No. 63/270,921 filed on Oct. 22, 2021, which is incorporated herein by reference in its entirety.

STATEMENT OF GOVERNMENT SUPPORT

This invention was made with government support under 1935324 awarded by the National Science Foundation. The government has certain rights in the invention.

TECHNICAL FIELD

This invention relates to reconfigurable joints for use in continuum robots using pinched, soft tubes.

BACKGROUND

Soft robots use intrinsically soft and extensible materials which allow for large and continuum-like deformation throughout the robot body. The reconfigurablity of soft robots allows them to bend and deform to adapt to their environment. For example, by implementing continuously bendable structures inside the soft robot body, soft robotic grippers can easily adapt their curvature to the target object, or soft mobile robots can adapt body stiffness to optimize for effective locomotive forces.

SUMMARY

This disclosure generally relates to the design, fabrication, and performance of tube-pinching reconfigurable revolute joints for use in soft continuum robots. The disclosure describes an intermediate approach towards achieving the versatility of continuum robots while maintaining the control and estimation methods of rigid robots. The design includes a soft tubular element which can be buckled through an internal negative pressure, with the buckling angle set by a confining sleeve. Once the tube is buckled it approximates a revolute joint with torsional stiffness. An appropriate sleeve shape that enables precise joint axis control is described. Internal vacuum pressure controls the torsional stiffness of the joint. A flapping tail in water that uses soft joint reconfiguration to enable different swimming modes is also described.

In a first general aspect, a device includes a tube and a sleeve configured to at least partially encircle a portion the tube along its length. The tube is flexible and airtight and defines a longitudinal axis along a center of the tube, and is configured to bend along the longitudinal axis upon at least partial evacuation of the tube to form a joint. The joint defines a joint angle relative to the longitudinal axis, thereby approximating a revolute joint with torsional stiffness.

Implementations of the first general aspect can include one or more of the following features.

The first general aspect can further include a cap at each end of the tube. The caps can be configured to provide an airtight seal to the tube. In some cases, the sleeve is rigid. The sleeve can be translatable along a length of the tube. An outer diameter of the sleeve can define at least two convex portions. In some implementations, a location of the sleeve along the length of the tube defines a location of the bend along the longitudinal axis. The sleeve can be configured to define a pinching angle of the tube. In some cases, the bend is formed along a cross-section of the tube. A position of the sleeve along the length of the tube can be selected to form the revolute joint at a desired location along the tube.

In some cases, an extent of the at least partial evacuation of the tube is selected to form the revolute joint at a desired angle relative to the longitudinal axis. A bending stiffness of the revolute joint in an off-axis direction can exceed that along a bending axis of the tube. In some implementations, at least partial evacuation of the tube creates a negative pressure inside the tube. The tube, when at negative pressure, can be bent to a desired joint stiffness at a desired joint angle. In some cases, the tube, when not subjected to at least partial evacuation, is substantially unbendable until after a threshold yield force is exceeded. The tube can be configured to be coupled to a vacuum apparatus, and the vacuum apparatus can be configured to achieve the at least partial evacuation of the tube. The joint can be reconfigurable. In some cases, the first general aspect is a tail of a multi-linkage swimming robot. The joint can demonstrate anisotropic torsional stiffness. In some implementations, the joint corresponds to a collapsed surface of the tube. The first general aspect can further include an actuation source coupled to the joint. A robot can include the tube.

In a second general aspect, actuating a joint includes partially evacuating a flexible tube defining a longitudinal axis, thereby forming a bend in the tube at an angle with respect to the longitudinal axis at a perimeter of a rigid sleeve at least partially encircling the tube, and restoring a neutral pressure to the tube, thereby removing the bend in the tube.

In a third general aspect, a device includes a tube and a module positioned inside the tube. The tube is flexible and airtight and defines a longitudinal axis along a center of the tube. The module is configured to translate along the longitudinal axis of the tube and expand the tube perpendicular to the longitudinal axis to define a joint. The tube is configured to bend along the longitudinal axis upon at least partial evacuation of the tube at the joint to define a joint angle relative to the longitudinal axis, thereby approximating a revolute joint with torsional stiffness.

Advantageous aspects of this disclosure include a design which permits the creation of various mechanisms with unique kinematics from a single soft tube, through the creation and on-demand configuration of joints. This permits different mechanisms to be created from one base element. The design allows the restoration of the joint to the original tubular shape once the forces are removed. Several joints can be connected together to create kinematic mechanisms on demand, and the orientation of each joint can be redefined.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 5A shows the kinematics of two-linkage tube made with two pinchable joints with various pinching axes. FIG. 5B shows plots of the displacement and speed profiles of a swimming robot.

FIG. 8A shows an apparatus used to measure joint stiffness.

DETAILED DESCRIPTION

This disclosure describes soft reconfigurable joints with adjustable joint axes and stiffness for use as soft robotic building blocks. A soft elastic tubular shell is used which can bend along any axis upon being pinched. Negative pressure within the tube causes buckling/pinching to occur along a cross-section of the tube and, through the use of a rigid confining sleeve, the exact buckling/pinching angle can be located. Thus, by changing the position and angle of the sleeve, joints can be created with desired locations and axes. The bending stiffness of the pinched joint is low in the preferred direction, but remains high in the off-axes directions. Through this buckling mechanism, a soft robot structure can be achieved with at least two states: 1) at neutral pressure and thus unbendable until after a yield force is exceeded; and 2) at negative pressure and thus buckled to a desired joint stiffness at desired joint angle.

The statics and kinematics of the pinched tubes are described in which the resolution of joint angle, stiffness control, two-joint kinematics, and underwater flapping modes are assessed. The tube-pinching joints are integrated into the tail of a multi-linkage swimming robot. An open-loop universal actuation source provides a neutral "direction free" source of flapping input, while the controllable tube pinching along a specific axis controls the flapping angle of the robot tail.

Figure 1A:
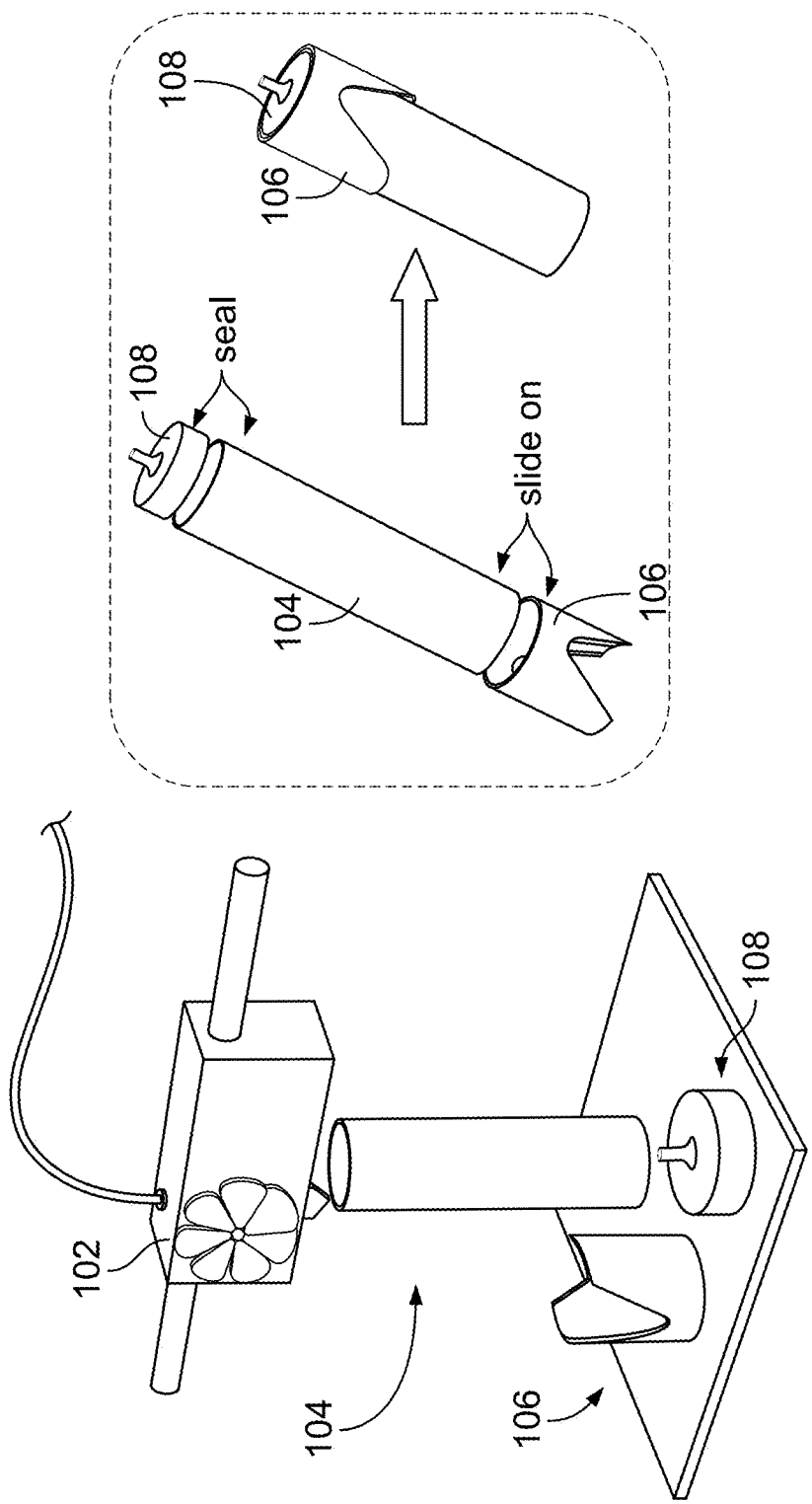
FIG. 1A shows components for the fabrication of the reconfigurable revolute joints.

The design of the reconfigurable revolute joints is based on negative pressure actuation of a sealed tubular shell that creates a buckled (or pinched) region with variously tunable stiffness and joint axis. FIG. 1A shows the components used in the fabrication of the tube-pinching revolute joints. A 3D printer 102 was used to form the flexible thermoplastic polyurethane (TPU) tube 104 and the rigid polylactic acid (PLA) pinch constraint sleeve 106 and sealing cap 108. The sealing cap 108 was tightly secured in the end of the tube 104 to provide an airtight seal. The pinch constraint sleeve 106 slides over the tube 104 and can be translated along its length.

Figure 1B:
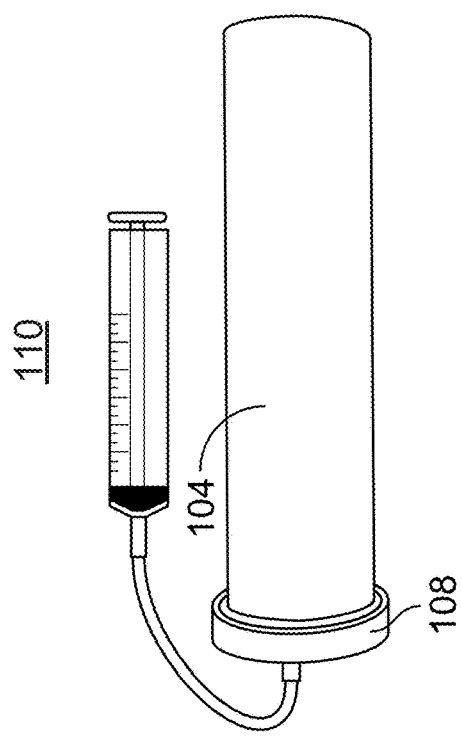
FIG. 1B shows pinching induced by negative pressure within a flexible tube.
Figure 1B:
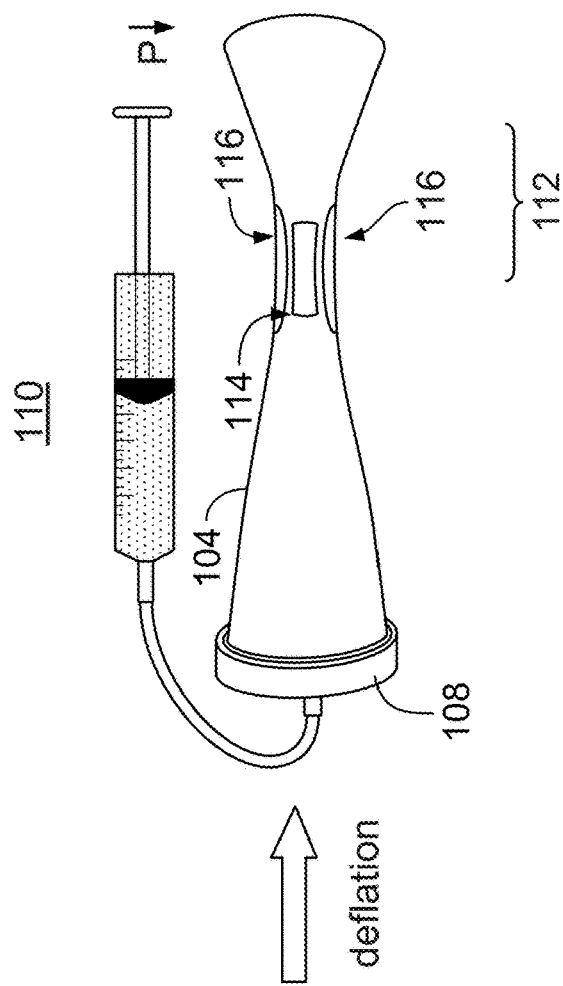

FIG. 1B shows the general mechanism that enables the reconfigurable revolute joints. A vacuum apparatus (e.g., a syringe 110) is coupled to the sealing cap 108 of the flexible tube 104 as a means to achieve partial evacuation of the tube. Partial evacuation of the tube 104 creates a negative pressure inside the tube 104. As air is withdrawn, the tube 104 forms a semi-two-dimensional (2D) buckled/pinched region 112 with two bulged edges 114 and collapsed surfaces 116. Such an induced pinch 112 can thus be utilized as a soft revolute joint with anisotropic torsional stiffness. This means that the bending stiffness in the pinched axis direction is low but remains high in off-axis orientations.

Figure 1C:
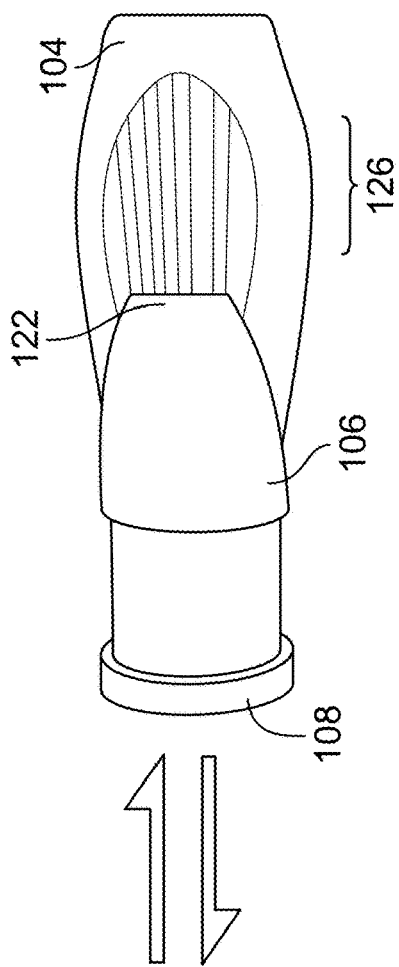
FIG. 1C shows a pinched joint with the pinch location and axis controlled by the sleeve.
Figure 1C:
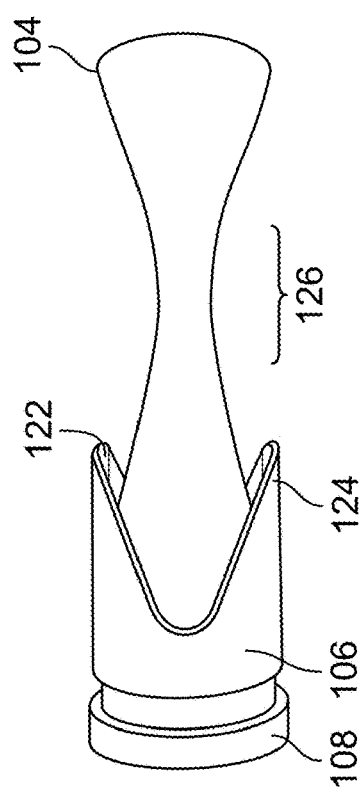
Figure 1D:
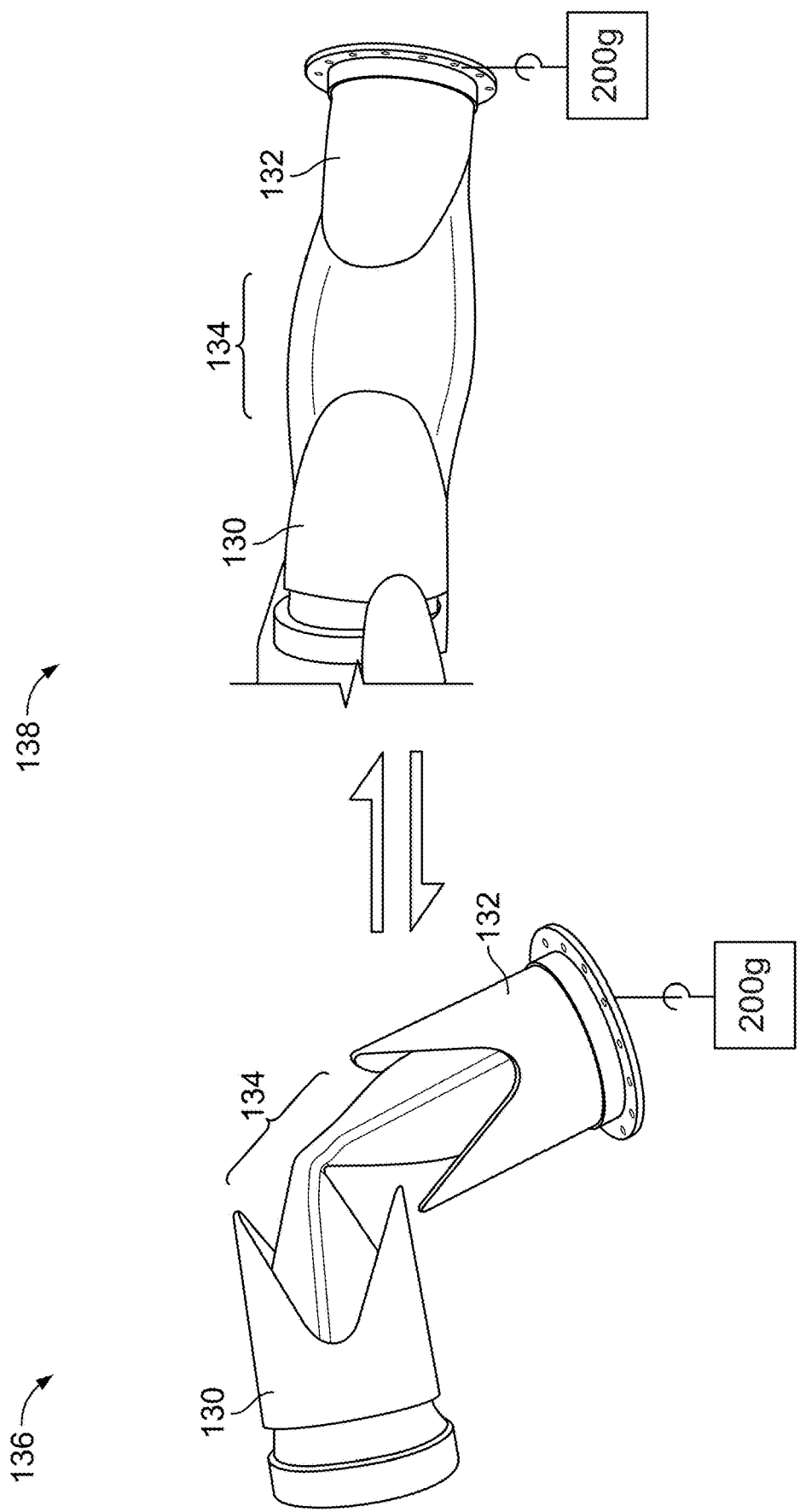
FIG. 1D shows a joint subjected to a load along the pinched axis and in an off-axis direction.

A soft tubular shell with homogeneous wall thickness may pinch unpredictably upon vacuuming. To prevent this, the rigid pinch constraint sleeve 106 (or sleeve) is positioned along the length of the tube 104 to confine the pinch axis and location, as shown in FIG. 1C. With the sleeve 106 installed, the pinch formation is constrained within the direction and co-aligns with the groove formed by the two convex portions 122 and 124 of the sleeve. The joint 126 corresponds to a collapsed surface of the tube 104. The bend is formed along a cross-section of the tube 104. The orientation of the sleeve 106 defines the pinching angle of the tube 104. The location of the joint is constrained if two sleeves 130 and 132 are installed in the configuration shown in FIG. 1D. The location of the revolute joint 134 along the tube can be selected by the position of the sleeves. Changing the position and/or orientation of the sleeve allows the joint to be reconfigurable. To demonstrate the anisotropic torsional stiffness of the joint, a 200 g weight was hung from the end of the tube, as shown in FIG. 1D. When the joint 134 is oriented along the bending axis of the tube 136, the bending stiffness is at a minimum and the joint deflects almost 90°. When the joint 134 is oriented in an off-axis direction 138, the bending stiffness is greater and the deflection of the tube minimal. The bending stiffness of the revolute joint 134 in an off-axis direction 138 exceeds that along a bending axis of the tube.

A desired joint deflection angle relative to the longitudinal axis of the tube can be formed by selecting the evacuation level of the tube. When not subjected to at least partial evacuation, the tube is substantially unbendable until after a threshold yield force is exceeded.

An actuation source can be coupled to the joint. The joint can be actuated by partially evacuating the tube defining a longitudinal axis, thereby forming a bend in the tube at an angle with respect to the longitudinal axis at a perimeter of a rigid sleeve at least partially encircling the tube; and restoring a neutral pressure to the tube, thereby removing the bend in the tube. A robot can include the joint. The joint can be a tail of a multi-linkage swimming robot.

In a second embodiment of a reconfigurable resolute joint using a flexible and airtight tube, a module is positioned inside the tube that can move along the longitudinal axis of the tube. The module can define a location of the joint by expanding the tube from within along an axis perpendicular to the longitudinal axis of the tube. Upon partial evacuation of the tube, a revolute joint with torsional stiffness forms at the expansion location.

EXAMPLES

Fabrication Process. All components for building the pinchable joint were fabricated via 3D printing on a fused deposition modeling (FDM) 3D printer (Prusa i3 MK3S). The size of the soft tube body is 180 mm in length, 50.5 mm outer diameter, 1.5 mm wall thickness, 319 mL in volume, and was printed with flexible thermoplastic (TPU). By printing with a fine layer thickness (0.1 mm-0.15 mm) airtight prints were achieved which allowed the control the tube's internal volume using a simple syringe (or a pump). The rigid sleeves and other auxiliary components were printed with rigid polylactic acid (PLA) filament as shown in FIG. 1A. The whole tube can thus be assembled by putting on the rigid sleeve with an air inlet installed on top of the sealed tube. The entire fabrication process can take around 4 hours with 2 FDM printers with around 5 minutes for the hand assembly.

Figure 2A:
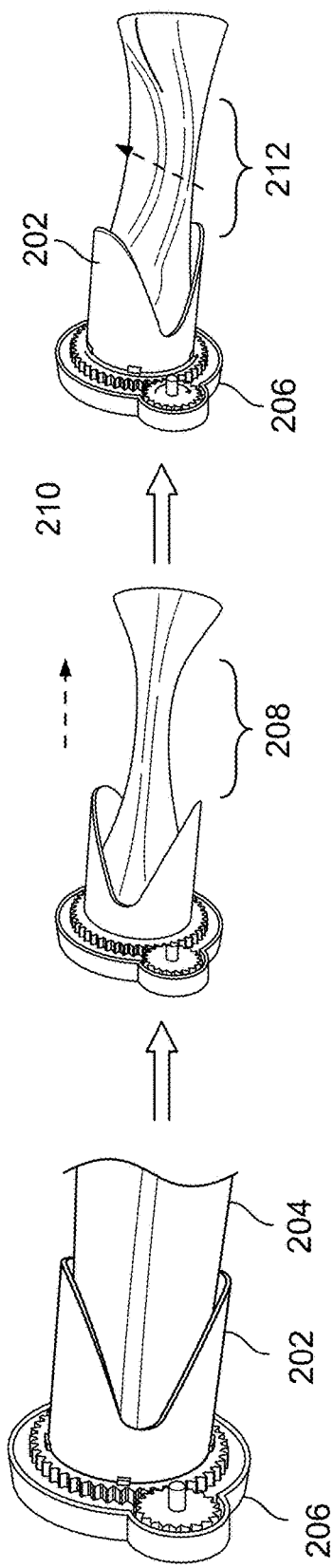
FIG. 2A shows the joint control mechanism using an external confining sleeve to constrain the pinch angle during each inflation-deflation cycle.

Joint Axis Defined by Sleeve Angle. This disclosure describes the fabrication of joints by vacuuming a sealed tubular shell and constraining the axis of that pinched region using a "V" shaped 3D printed sleeve. As shown in FIG. 2A, with the rigid pinch constraint sleeve 202 installed over the tube 204, a motorized gear system 206 can drive and change the sleeve angle. When the tube is vacuumed, it creates a pinched region 208 the axis of which is aligned with the sleeve axis. To reconfigure the joint axis 210, the tube is reinflated and the sleeve axis is rotated using the motorized gear system 206 before the tube is deflated again to form a pinched region 212 with a new joint axis.

Figure 2B:
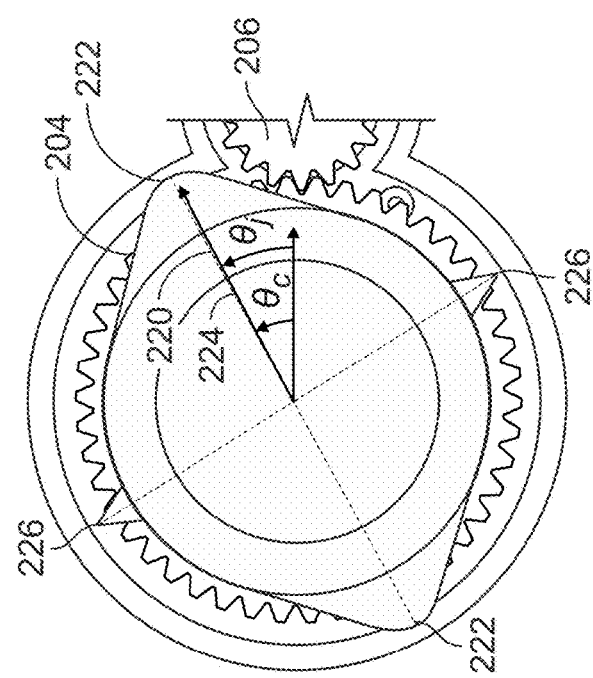
FIG. 2B is a front view showing the angular mismatch between the sleeve axis and the pinched joint axis.
Figure 2C:
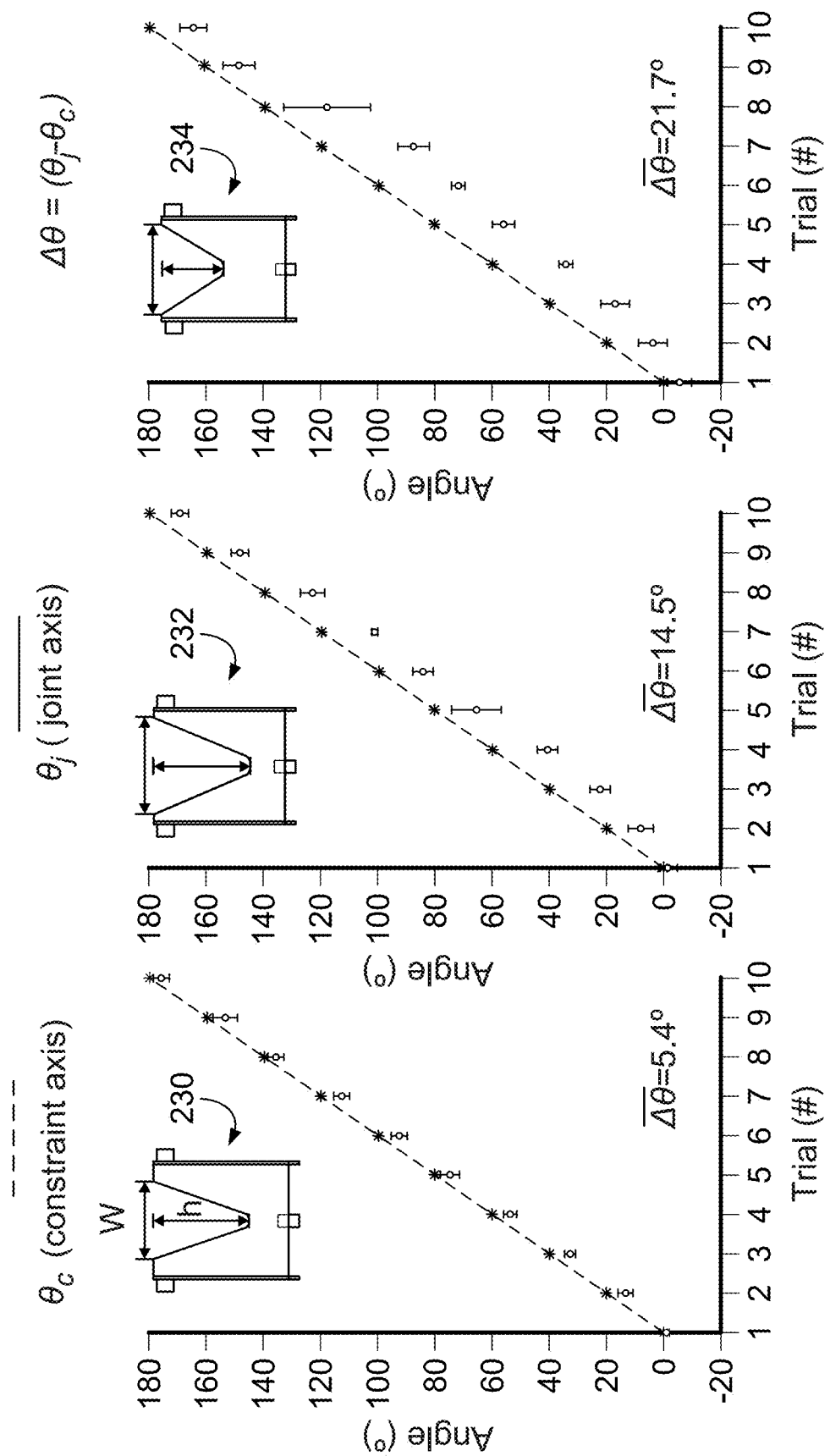
FIG. 2C shows plots of angular mismatch between the constraining sleeve axis (dotted line) and the joint axis (points with error bars) for different geometric parameters of the sleeve. The width and the depth of the "V" shaped groove in the external confining sleeve were varied.

Co-alignment between the joint and the sleeve can be largely controlled by grooves formed by convex portions of the rigid pinch constraint sleeve which is highly affected by the geometric parameters of the "V" shape. To characterize the co-alignment, front view pictures were taken of the pinched joint as shown in FIG. 2B, and the mismatch was compared between the joint axis 220 (defined by the bulged edges 222) and the sleeve axis 224 (defined by the pointed edges 226 from the 3D prints). As shown in FIG. 2C, the width and the depth of the "V" shape were varied for sleeve-joint axis comparison. A deep and narrowed "V" shape 230 has a better constraining effect than shallow and widened shapes 232 and 234 (width change from 18 mm to 24 mm and depth change from 30 mm to 45 mm). An averaged angular mismatch was measured to be 5.4°, 14.5°, and 21.7° for the three sleeve sets. As a verification, the same design parameters for both the pinchable tube and the confining sleeves were put into a static simulation (ANSYS), and a similar pressure condition was applied as in the experiment (110 mL air extraction of the tube with a 319 mL internal volume). The simulated results matched with the experimental sets from the deep and narrowed "V shape" (width 18 mm, depth 45 mm) but differ slightly from the other two sets. The sleeve design helps confine the joint axis by confining the bulged edges to form only in the groove region and thus a sleeve design with a deep but narrowed "V shape" shows the best results among the sleeve designs.

Figure 3A:
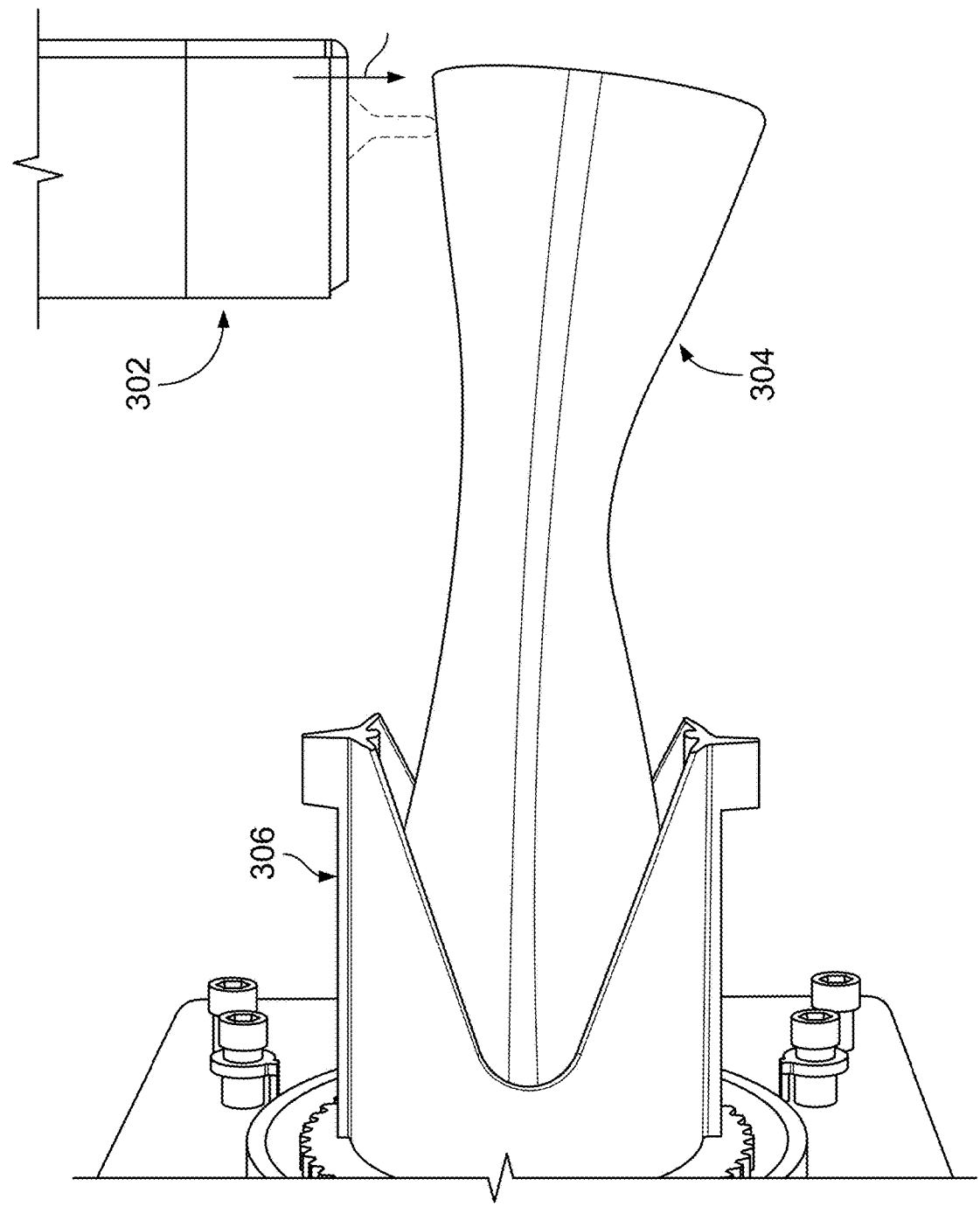
FIG. 3A shows an apparatus for testing anisotropic and variable stiffness of the pinched joint.

Variable Joint Stiffness from Pinch Control. The stiffness profile of a reconfigurable revolute joint can be controlled by tuning the joint axis and/or changing the internal volume of the tube. The stiffness was characterized based on a linear motorized force sensor gauge 302 (Mark-10, ESM750) in which the tube's neutral axis was aligned with the external loading part as shown in FIG. 3A. The sample 304 (a piece of sealed TPU tubing) had measurements of 50.5 mm (diameter)×180 mm (length), with a 1.5 mm wall thickness. The sample was fixed at one end like a cantilever beam with the load exerted at the other end. The loading speed was set to 100 mm/min with a 10 mm travel distance. The stiffness was measured with respect two variables: 1) tunable sleeve constraint 306 orientation and thus joint axis; and 2) different internal volume extracted $\Delta V$ using a syringe with the joint axis poised at 0°.

Figures 3B, 3C:
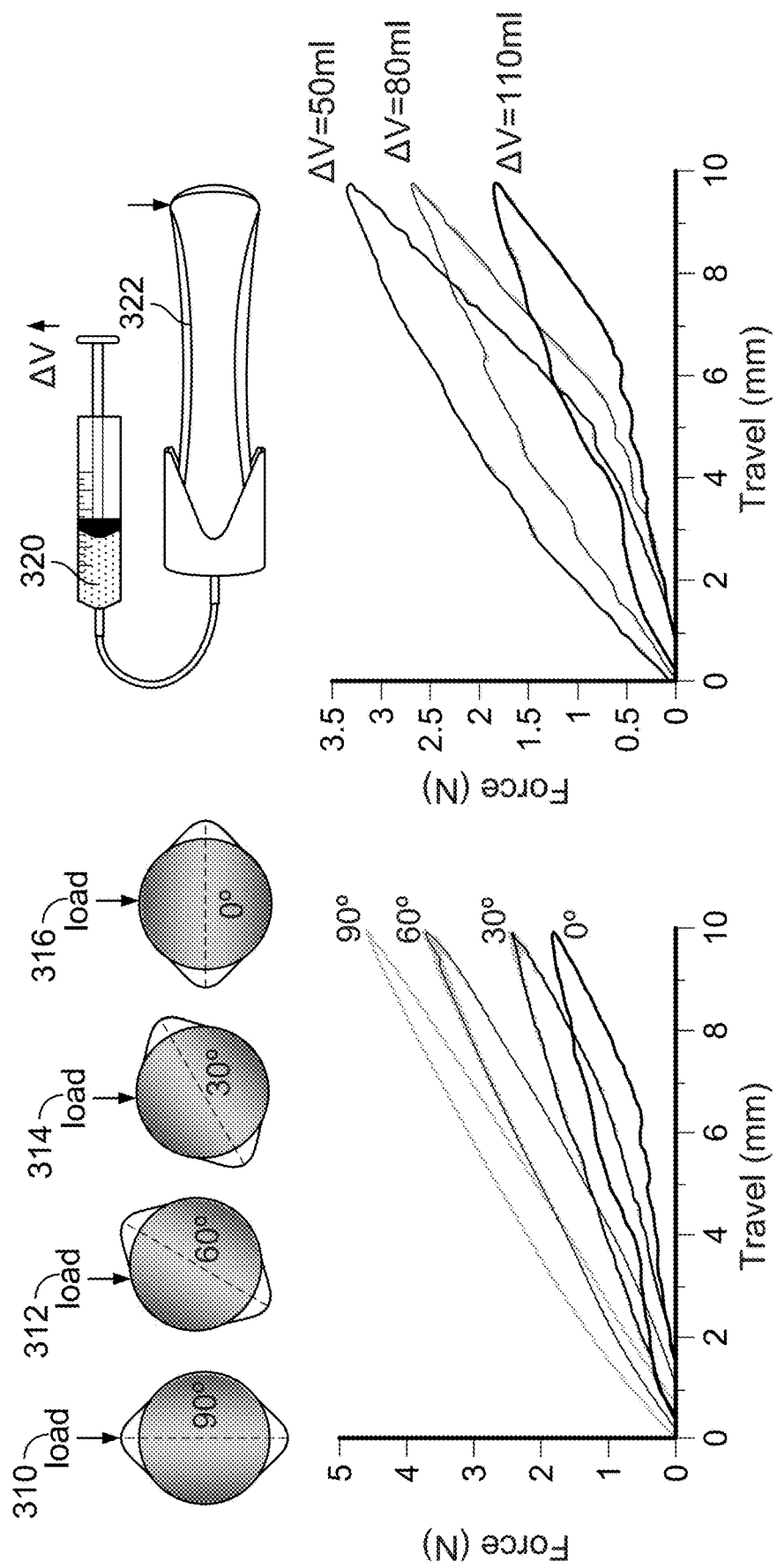
FIG. 3B shows plots of joint stiffness for different load orientations with respect to the pinch axis.
FIG. 3C shows plots of joint stiffness for different internal tube volumes.

For tunable joint axis, the tube's pinch angle was varied from 90° (co-aligned) to 0° (perpendicular), while the internal tube volume extracted was kept at 110 mL throughout the sets. As shown in FIG. 3B, during the loading process, the joint exerted increasing reaction force linearly with the load travel; however, it exhibited reduced load rate during the unloading process due to the nonlinear hysteresis from the tube pinching and buckling. For different joint axes 310, 312, 314, and 316, the highest stiffness profile was observed when the joint was poised at 90° 310, and the lowest stiffness profile was observed when the joint was at 0° 316. The load rate (stiffness) lowered gradually as the joint axis was tuned from 90° 310 to 0° 316. This can be due at least in part to the anisotropic stiffness profile from the pinched region of a flexible tubing. Such a phenomenon can be utilized for varying the joint bending stiffness by selecting a highly resisting joint axis while maintaining softness in the orthogonal direction.

A similar stiffness analysis shown in FIG. 3C was conducted based on different internal volume extracted from the test sample. In this set, the joint axis was fixed at 0° 316, and the volume extracted was varied from 50 mL to 80 mL to 110 mL. As the internal volume of the tube was changed, the inside pressure using a pressure sensor was measured (Honeywell, NBP, 0-30 psi). The system pressure between the syringe 320 and the pinched tubing 322 remained almost unchanged with different tube internal volumes extracted. In FIG. 3C, a drop of force rate (stiffness) was observed as the internal tube volume extracted was increased, which is due at least in part to the reduced cross sectional areas of the pinched tube as well as the curved surface from buckling. Joint hysteresis can also be observed during the loading and unloading process. The hysteresis is due at least in part to the buckling from the lower surface of the tube that dissipates more energy as it recovers to its neutral state. All tests (for both tunable axis and volume control) were sampled and averaged with five independent trials in which the internal air volume was reset for each data set using the same tube (joint) sample.

Figure 4A:
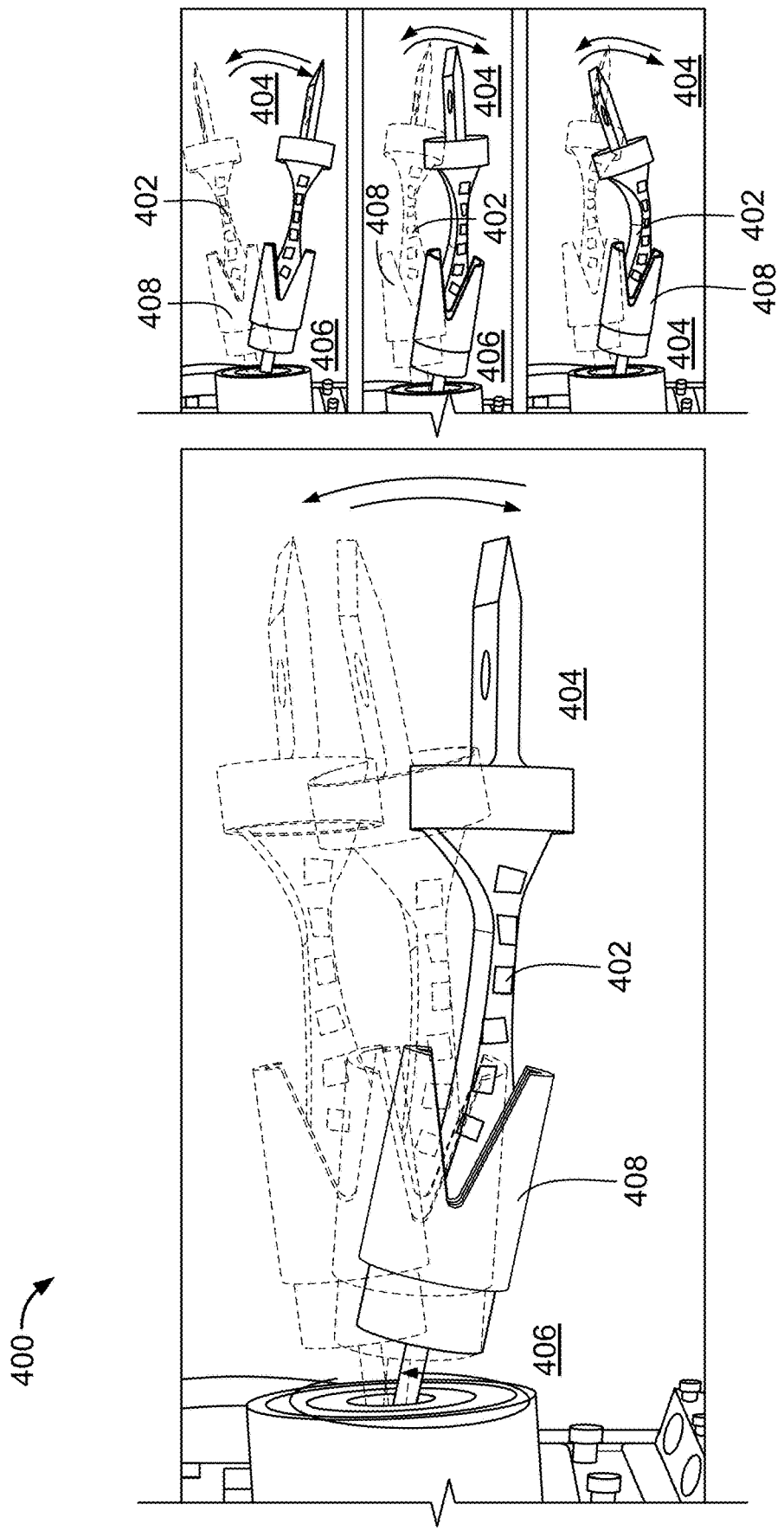
FIG. 4A is a multi-frame image from a video of an actuated joint flapping in water. A rotary motor causes the joint to undergo a circular motion, and when the joint is buckled at a specific angle the tail exhibits flapping motion along that axis plane.
Figure 4B:
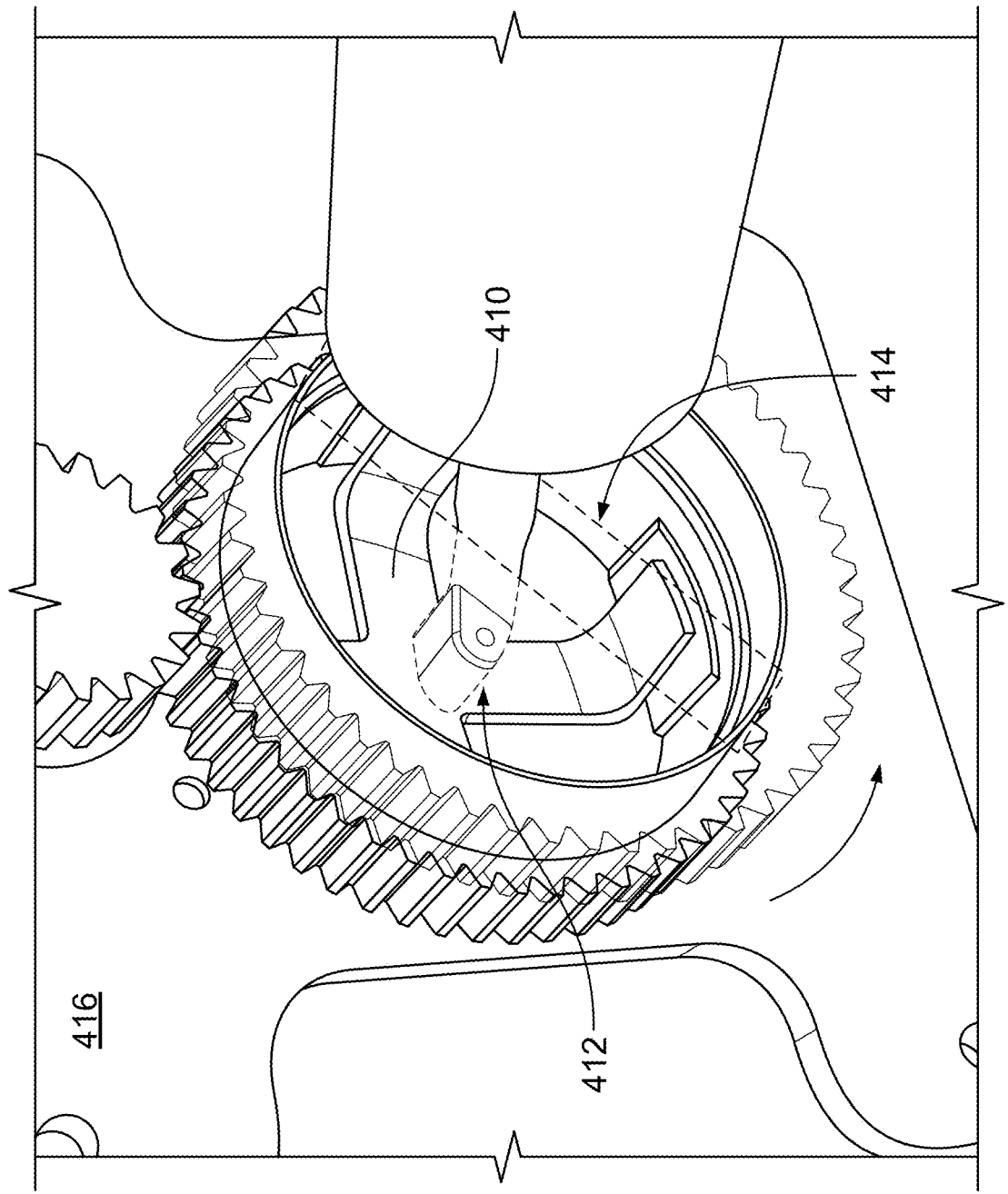
FIG. 4B shows the universal actuation mechanism.

Underwater Joint Kinematics via Universal Actuation. Referring to FIG. 4A, the motion of the soft robot system 400 can be reconfigured through the individual joint/pinch axis or stiffness without modulating the main actuation input. Specifically, by inducing a pinch in a soft continuum appendage 402, desired oscillatory modes of can be selected out even with a nondirectional actuation input. This design is employed in an underwater flapping tail 404 with a stepper motor 406 (17hs19-2004s1) universally spinning without preferred directions. To achieve the proposed motion strategy, the tail should not rotate itself since the desired joint axis determined by the orientation of sleeve 408 is to remain at a fixed angle. Referring to FIG. 4B, the tail was fixed to a stationary base 410 using TYGON tubing 412 with a high torsional stiffness to prevent the tail from self-spinning. The tail was also constrained by an eccentric distance 414 to amplify the motion amplitude for an observable flapping motion. An indirect drive system was fabricated using a 3D printed gear drive 416 coupled with the motor input.

Figure 4C:
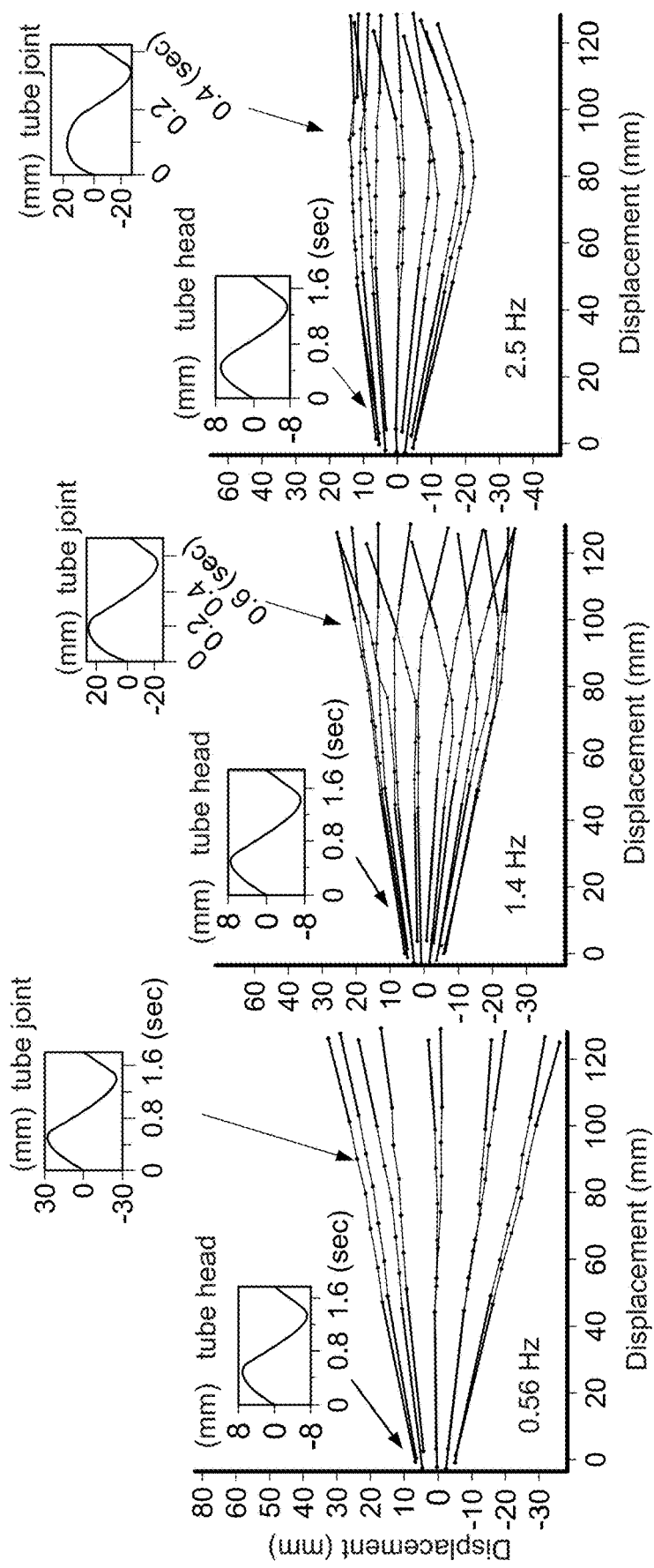
FIG. 4C shows plots of tail flapping results at three frequencies demonstrating the different behaviors of the tube. Low frequencies do not induce joint bending, modest frequencies induce symmetric joint buckling and thus flapping motion, and high frequencies induce asymmetric (biased) flapping motion.

Under such a universal actuation method, the underwater tail flapping performance was analyzed by driving the pinched joint under different input frequencies. Results of the analysis are shown in FIG. 4C. At a low spinning frequency (0.56 Hz), the joint acted as a rigid tail with a symmetric end tip trajectory. As the driving frequency was increased to 1.4 Hz, symmetric tail flapping motion was observed with the joint bending out of phase to the input. As the input frequency increased to 2.5 Hz, a biased flapping motion of the joint from a universal actuation was observed. Such a phenomenon may be caused by the hysteretic stiffness from the pinched tube plus the initial conditions (e.g., facing of the tail and the joint axis), which shows the potential of altering the underwater locomotion by changing only the input driving frequency.

Demonstration of the Two-Joint Kinematics and a Swimming Robot. To increase the degrees of freedom of the soft tubular structure, two pinchable joints were connected together through a 3D printed part. This enables not only 3D construction space of the tube using two perpendicular revolute joints, but also various deformation pattern by modulating the individual stiffness (or stiffness ratio) between the two joints.

As shown in FIG. 5A, a two-joint linkage system 500 with reconfigurable configuration spaces was constructed using the tunable joint axis and variable bending stiffness controlled by internal tube volume. With the two linkages 502 and 504 in different combinations of pinch axes as determined by the orientation of sleeves 506 and 508, variations in joint flexibility and range of motion of the reconfigurable robotic linkage system can be achieved. For configuration 510, joint 502 is at set at minimum stiffness and joint 504 is set at maximum stiffness. For configuration 512, both joints 502 and 504 are set at maximum stiffness. For configuration 514, joint 502 is set for maximum stiffness and joint 504 is set for minimum stiffness. For configuration 516, both joints 502 and 504 are set for minimum stiffness.

Swimming Performance of a Simple Two-Joint Robot. For the swimming robot analysis, two reconfigurable joints were assembled in series as a continuum flapping tail and mounted on a rail system to observe the linear flapping motion. The two joint axes were aligned and mounted a rigid tail by the end of the robot (60 mm tail length). The tail was driven by the same universal actuation method as described with reference to the underwater kinematics. Under a 2.35 Hz input frequency, the two-joint system moves steadily at an average speed of 14.1 mm/s shown in FIG. 5B.

Figure 6A:
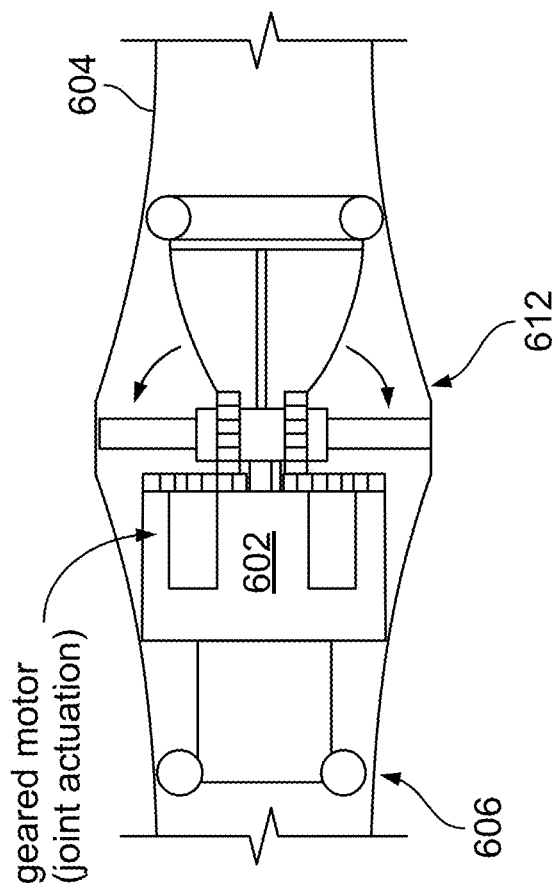
FIG. 6A depicts an internal module for the creation of a pinched joint with variable angle and position.
Figure 6A:
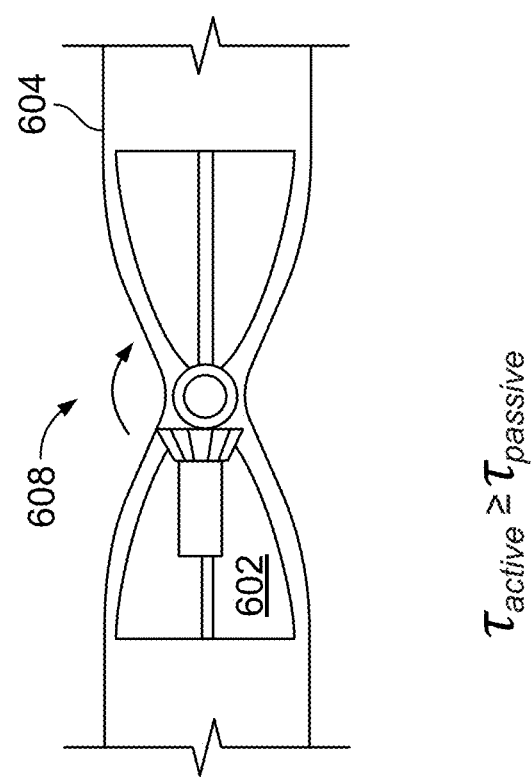
Figure 6B:
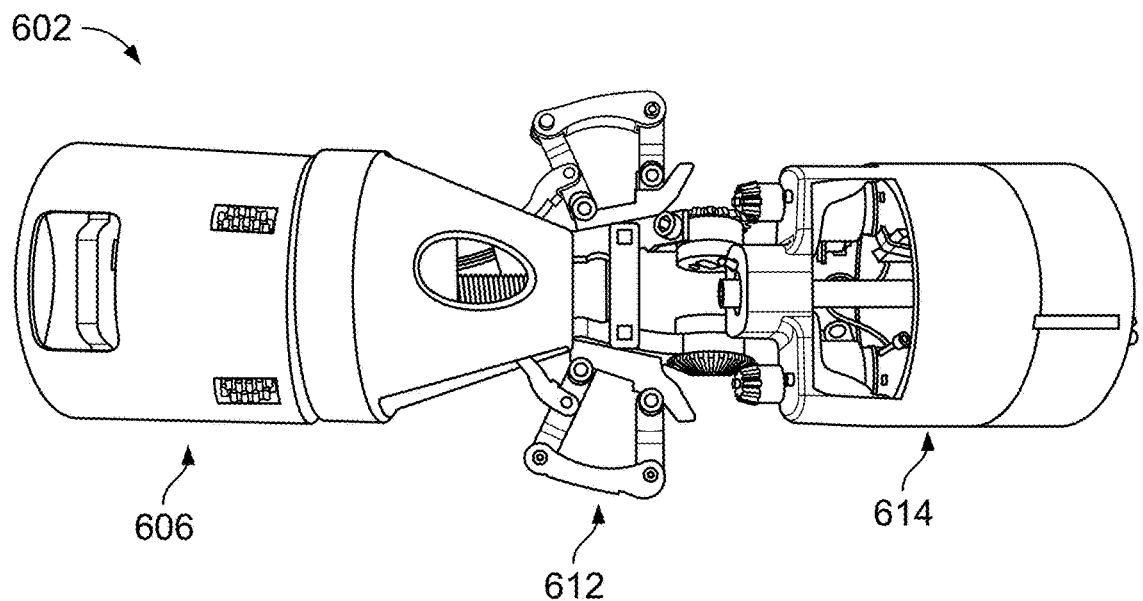
FIG. 6B shows a 3D printed internal module with geared motors for joint reconfiguration.
Figure 6C:
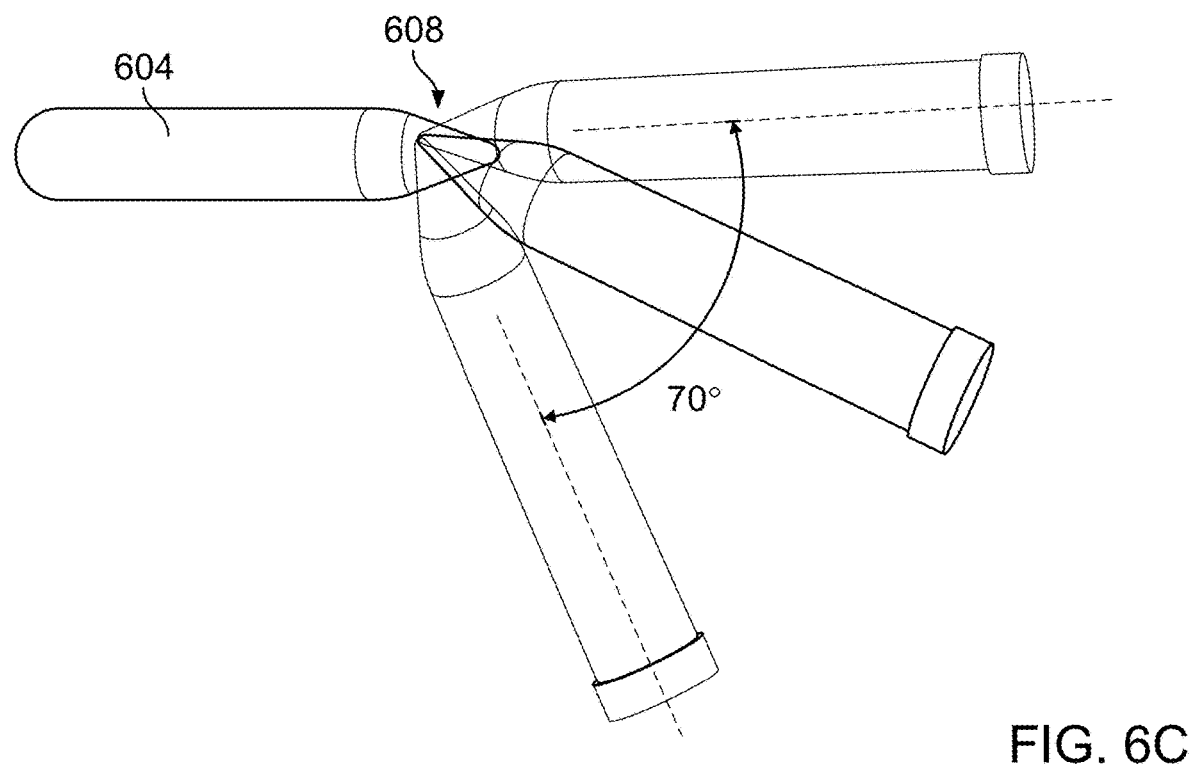
FIG. 6C shows an inflatable tube with a joint actuated from inside by the internal module.

A second embodiment of a reconfigurable resolute joint using a flexible and airtight inflatable tube is depicted on FIG. 6A. A module 602 is positioned inside the tube 604. The module 602, which can translate along the longitudinal axis of the tube 604 using sliding mechanism 606, can define a location of the joint 608 by expanding the tube from within. Upon partial evacuation of the tube, a revolute joint 608 with torsional stiffness forms at the expansion location using a pinch mechanism 612. FIG. 6B shows a 3D printed internal module 602 with geared motors for joint reconfiguration. The sliding mechanism 606 is used to translate the module 602 inside the tube 604 to set the location of the joint 608. The pinch mechanism 612, driven by the joint actuation motor 614, expands the tube in a direction perpendicular to the longitudinal axis of the tube to form the joint. FIG. 6C shows an inflatable tube 604 with a joint 608 actuated from inside by the internal module.

Figure 7B:
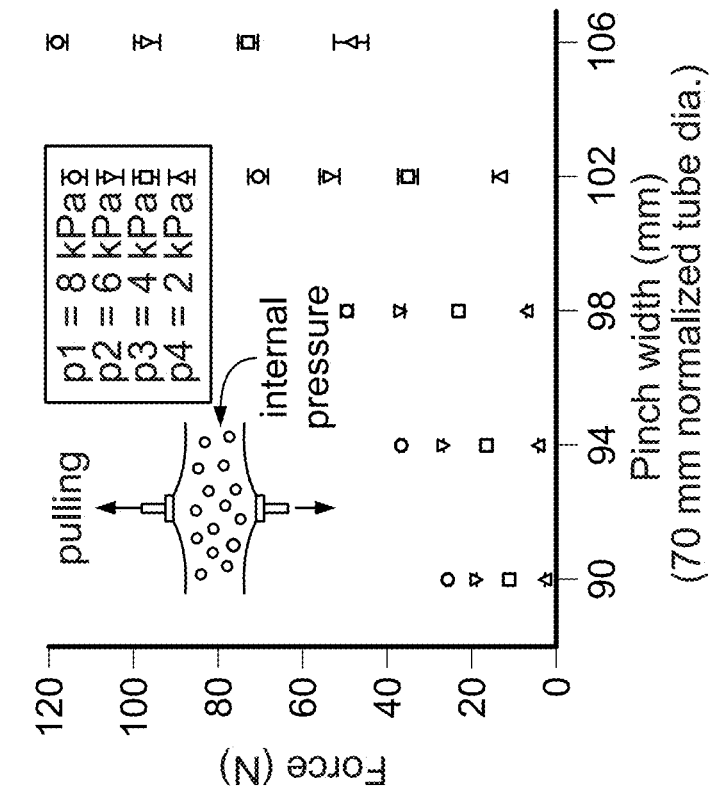
FIG. 7B is a plot of the force required to pinch a tube under different internal pressures.
Figure 7A:
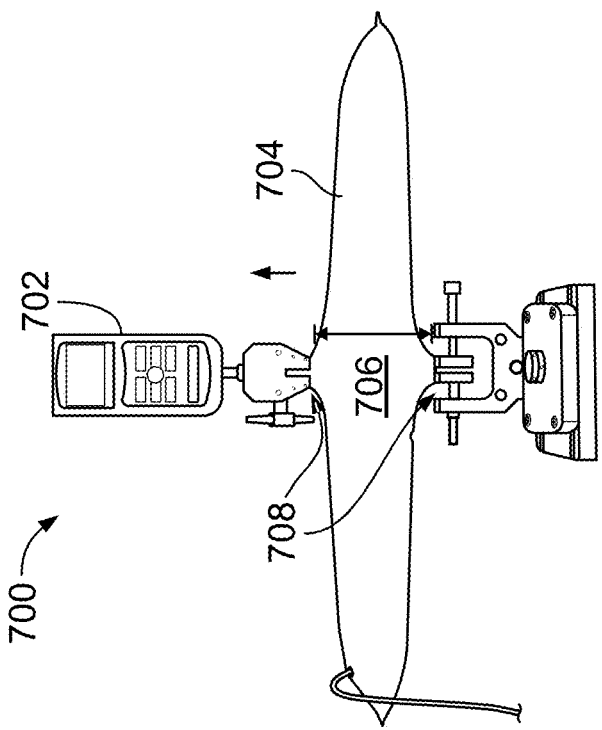
FIG. 7A shows an apparatus used to measure the force required to pinch a tube.

FIG. 7A shows an apparatus used to measure the force required expand a tube to form the pinched joint. A force meter 702 is used to measure the force required pull apart the sides of tube 704 to given distance (i.e., pinch width 706) as a function of internal tube pressure. The sides of the tube are anchored at points 708. FIG. 7B is a plot of the force required to expand the tube to form the pinched joint with different internal tube pressures.

Figures 8B, 8C:
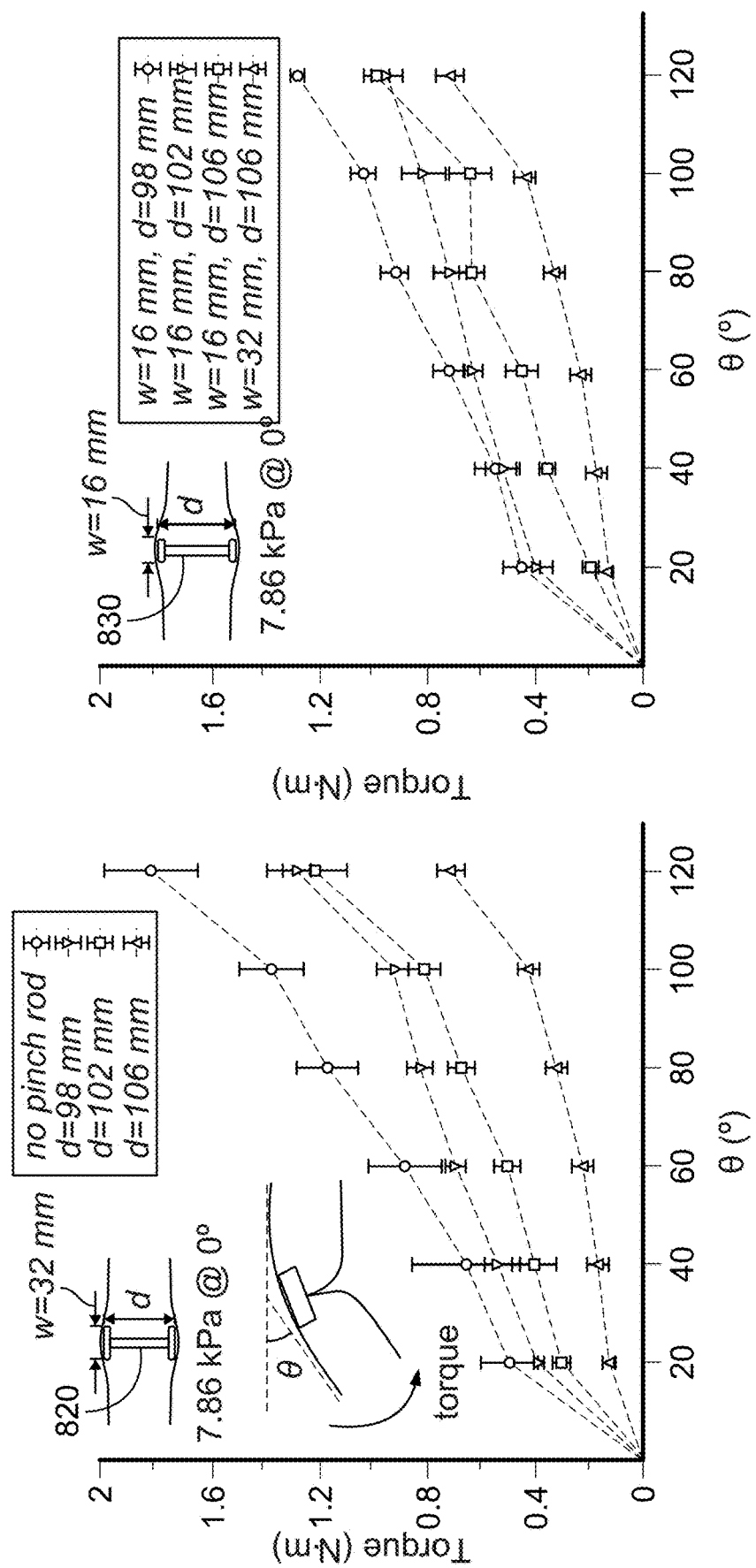
FIG. 8B shows plots of measured torque as a function of joint angle for different lengths of pincher rods.
FIG. 8C shows plots of measurements made under the same conditions as FIG. 8B but with different pincher rod widths producing different pinch geometries.

FIG. 8A shows an apparatus 800 used to measure joint stiffness for joints made using rigid pincher rods 802 to expand a tube 804. The rods 802 are inserted in the tube 804 to form a joint 806 at the pinch location 810. Force sensor 812 measures the torque required to bend the joint 806 to an angle θ. FIG. 8B shows plots of measured torque as a function of joint angle for different lengths of pincher rods 820. FIG. 8C shows plots of measurements made under the same conditions as FIG. 8B but with a pincher rods 830 with different widths producing different pinch geometries.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A device comprising:
   a tube, wherein the tube is flexible and defines a longitudinal axis along a center of the tube;
   a sleeve configured to at least partially encircle a portion of the tube along a length of the tube, wherein the sleeve defines at least two convex protrusions and is translatable along the length of the tube; and
   a cap at each end of the tube, wherein the caps are configured to seal the tube,
   wherein the tube is configured to bend along the longitudinal axis upon at least partial evacuation of the tube to form a joint that defines a joint angle relative to the longitudinal axis, thereby approximating a revolute joint with torsional stiffness.

2. The device of claim 1, wherein the sleeve is rigid.

3. The device of claim 1, wherein a location of the sleeve along the length of the tube defines a location of the bend along the longitudinal axis.

4. The device of claim 1, wherein the sleeve is configured to define a pinching angle of the tube.

5. The device of claim 1, wherein the bend is formed along a cross-section of the tube.

6. The device of claim 1, wherein the tube, when not subjected to at least partial evacuation, is substantially unbendable until after a threshold yield force is exceeded.

7. The device of claim 1, wherein the tube is configured to be coupled to a vacuum apparatus, and the vacuum apparatus is configured to achieve the at least partial evacuation of the tube.

8. The device of claim 1, wherein the joint is reconfigurable.

9. The device of claim 1, wherein the device is a tail of a multi-linkage swimming robot.

10. The device of claim 1, wherein the joint demonstrates anisotropic torsional stiffness.

11. The device of claim 1, further comprising an actuation source coupled to the joint.

12. A robot comprising the device of claim 1.

13. The device of claim 1, wherein a position of the sleeve along the length of the tube is selected to form the revolute joint at a desired location along the tube.

14. The device of claim 13, wherein an extent of the at least partial evacuation of the tube is selected to form the revolute joint at a desired angle relative to the longitudinal axis.

15. The device of claim 13, wherein a bending stiffness of the revolute joint in an off-axis direction exceeds that along a bending axis of the tube.

16. The device of claim 1, wherein the at least partial evacuation of the tube creates a negative pressure inside the tube.

17. The device of claim 16, wherein the tube, when at negative pressure, is bent to a desired joint stiffness at a desired joint angle.

18. The device of claim 1, wherein the sleeve defines two convex protrusions.

19. The device of claim 18, wherein the sleeve defines grooves between the two convex protrusions.

20. The device of claim 18, wherein the sleeve encircles the portion of the tube and the two convex protrusions are equally spaced around a circumference of the sleeve.

* * * * *